United States Patent [19]
Lee

[11] Patent Number: 6,092,962
[45] Date of Patent: Jul. 25, 2000

[54] PREFABRICATED PRE-CAST CULVERT PROVIDED WITH COUPLINGS

[75] Inventor: Suk Tae Lee, Kyoungki-do, Rep. of Korea

[73] Assignee: To-Am Industrial Co., Ltd., Kyoungki-Do, Rep. of Korea

[21] Appl. No.: 09/130,707

[22] Filed: Aug. 6, 1998

[51] Int. Cl.[7] .............................. F16L 37/00; F16L 49/00
[52] U.S. Cl. ......................................................... 405/126
[58] Field of Search ................................. 405/124, 126, 405/136, 137; 404/6, 7, 47, 50, 51, 56; 285/286.2, 290.3, 290.4, 148.7, 230, 335, 336

[56] References Cited

U.S. PATENT DOCUMENTS

| | | | |
|---|---|---|---|
| 1,050,052 | 1/1913 | Allen | 285/290.2 |
| 1,055,162 | 3/1913 | Gilligan | 285/290.3 |
| 1,063,865 | 6/1913 | Euler | 285/290.2 |
| 1,082,724 | 12/1913 | Allen | 285/290.2 |
| 1,120,471 | 12/1914 | Franklin | 405/125 |
| 1,230,383 | 6/1917 | Cox | 405/126 X |
| 1,363,056 | 12/1920 | Riedl | 405/126 X |
| 1,387,025 | 8/1921 | Walker | 285/290.2 X |
| 1,412,616 | 4/1922 | Kammerer et al. | 405/126 X |
| 1,579,285 | 4/1926 | Danaher et al. | 285/55 |
| 1,612,640 | 12/1926 | Morgan | 405/126 X |
| 2,716,864 | 9/1955 | Hacker | 405/126 |
| 4,854,775 | 8/1989 | Lockwood | 405/126 |

*Primary Examiner*—Eileen Dunn Lillis
*Assistant Examiner*—Tara L. Mayo
*Attorney, Agent, or Firm*—Lackenbach Siegel Marzullo Aronson & Greenspan, P.C.

[57] ABSTRACT

A prefabricated pre-cast culvert including a box-shaped culvert body, which is open at both longitudinal ends thereof to have opposite end surfaces, a pair of mortar grooves each formed on an associated one of the end surfaces in such a fashion that it extends along the entire length of the associated end surface, and a plurality of couplings arranged in each of the mortar grooves. Each coupling includes a pair of connecting eye bolts threadedly coupled to the culvert body. Each coupling has an eye which is aligned with an eye of a corresponding coupling provided at another culvert to be longitudinally connected to the culvert when the culverts are in contact with each other at facing end surfaces thereof. The culverts are connected to each other by a steel rod inserted into the aligned eyes along the mortar groove.

8 Claims, 5 Drawing Sheets

PREFABRICATED PRE-CAST CULVERT PROVIDED WITH COUPLINGS

BACKGROUND OF THE INVENTION

1. Field of the Invention

The present invention relates to a prefabricated pre-cast culvert provided with couplings.

2. Description of the Prior Art

As well known, pre-cast culverts, which are made of reinforced concrete, are buried under roads so that they are used for sewer pipes, waterways, cavity passages, underground distribution lines, communication cable lines, and other passages. Such pre-cast culverts are used in the form of a variety of prefabricated modular products in order to reduce labor costs and construction time or to avoid traffic jams at places where culverts are buried.

In such conventional prefabricated pre-cast culverts, adjacent ones are connected to each other using a water-resistant material and a back-up material provided at their connections. However, a degradation may occur in the water-resistant material provided at those connections. Furthermore, there may be a differential subsidence of the ground, on which culverts are placed, due to an insufficient hardness of the ground. For these reasons, the connected culverts may have discontinuous portions resulting in a leakage of water. This results in a problem in quality control.

SUMMARY OF THE INVENTION

Therefore, an object of the invention is to solve the above mentioned problem and to provide a prefabricated pre-cast culvert provided with couplings capable of a firm connection between adjacent culverts, thereby preventing a leakage of water through the connection.

In accordance with the present invention, this object is accomplished by providing a prefabricated pre-cast culvert comprising a box-shaped culvert body, which is open at both longitudinal ends thereof to have opposite end surfaces, and a pair of mortar grooves each formed on an associated one of the end surfaces in such a fashion that it extends along the entire length of the associated end surface, further comprising: a plurality of couplings arranged in each of the mortar grooves.

In accordance with an embodiment of the present invention, each of the couplings comprises at least one connecting eye bolt threadedly coupled to the culvert body.

In accordance with another embodiment of the present invention, each of the couplings comprises at least one U-shaped coupling member provided at both ends thereof with anchors buried in the culvert body, respectively.

Each of the couplings has an eye, which is adapted to be aligned with an eye of a corresponding coupling provided at another culvert to be longitudinally connected to the culvert when the culverts are in contact with each other at facing end surfaces thereof, so that the culverts are connected to each other by a steel rod inserted into the aligned eyes.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
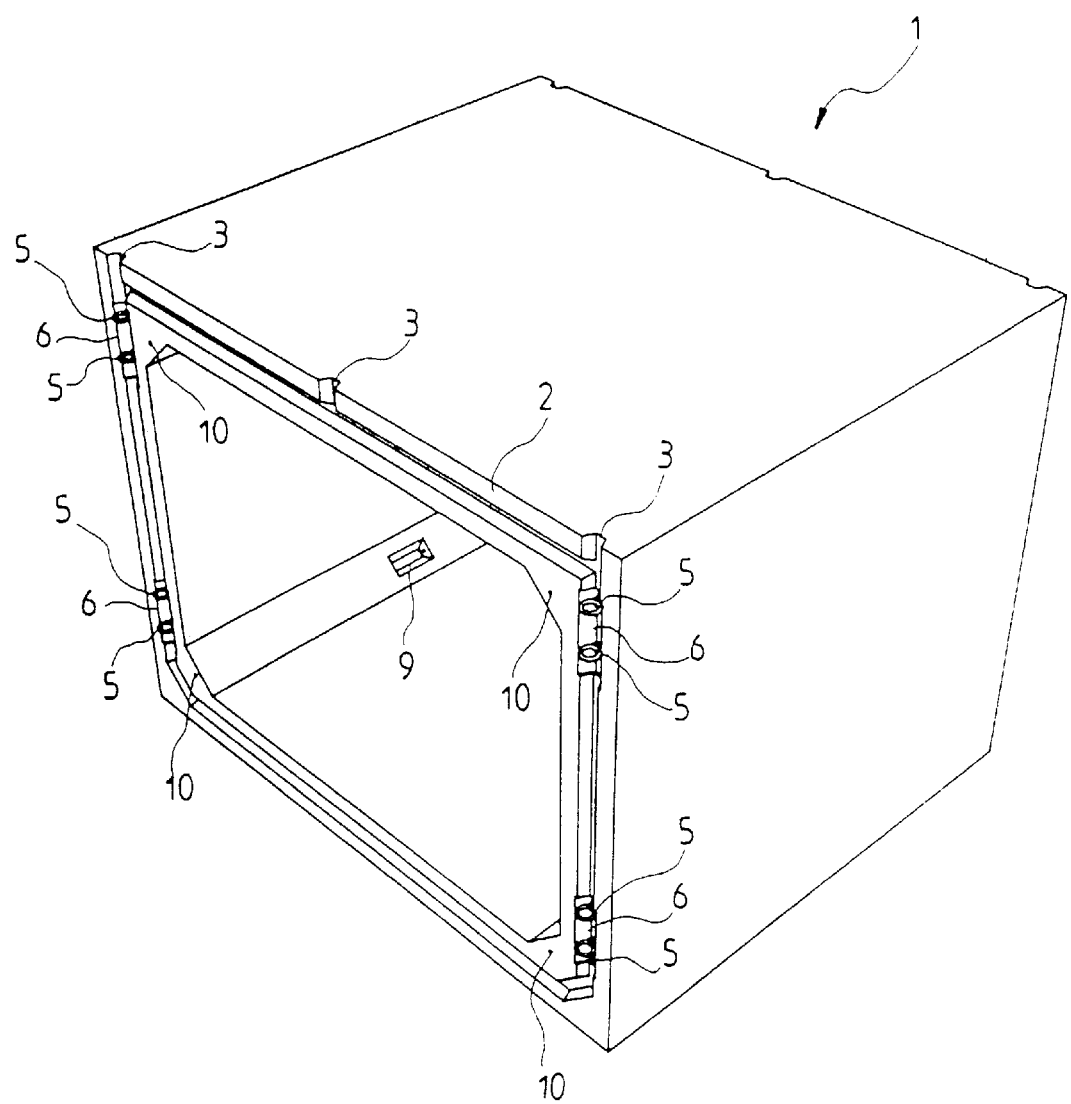
FIG. 1 is a perspective view illustrating a prefabricated pre-cast culvert according to an embodiment of the present invention.

Referring to FIG. 1, a prefabricated pre-cast culvert according to an embodiment of the present invention is illustrated. As shown in FIG. 1, the culvert includes a box-shaped culvert body 1 which is open at both longitudinal ends thereof. The culvert is to be longitudinally connected to other culverts at its longitudinal ends, respectively. A mortar groove 3 is formed on each end surface in such a fashion that it extends along the entire length of the end surface. The mortar groove 3 is provided with a plurality of enlarged mortar recesses 6. A coupling is arranged in each of the mortar recess 6. In the case illustrated in FIG. 1, the coupling includes a pair of connecting eye bolts 5 mounted to the culvert body 1.

Steel wire guide passages 10 are longitudinally formed through the culvert body 1 at four corners of the culvert body 1, respectively. As shown in FIG. 1, each steel wire guide passage 10 is provided at its middle portion with an opening 9.

Figure 2:
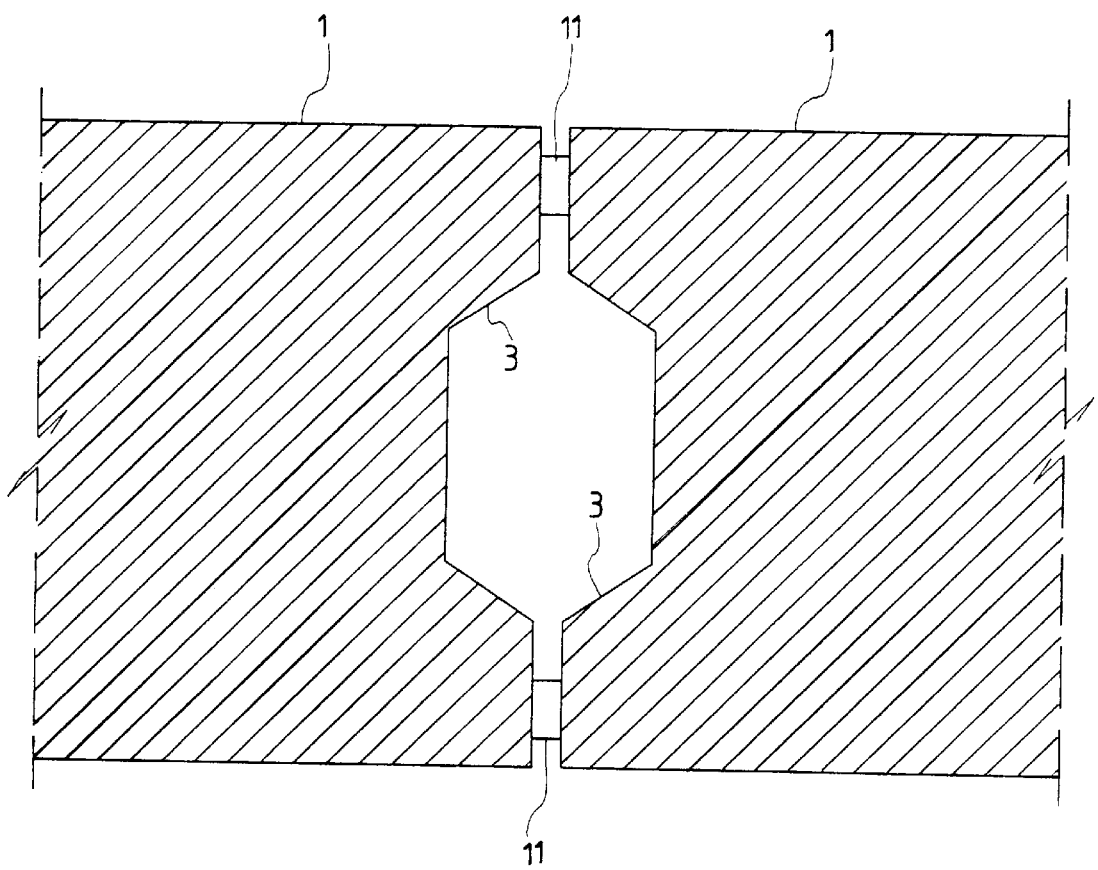
FIG. 2 is a cross-sectional view illustrating facing mortar grooves of adjacent culverts having the construction of FIG. 1.

FIG. 2 is a cross-sectional view illustrating the condition in which culverts to be longitudinally connected to each other are arranged to be adjacent to each other in such a manner that their mortar grooves 3 face each other. Packing members 11 are interposed between the adjacent culverts at opposite sides of the facing mortar grooves 3, respectively, in such a fashion that they extend along the mortar grooves 3. The packing members 11 serve to prevent mortar, which is poured into a space defined by the facing mortar grooves 3, from being leaked.

Figure 3:
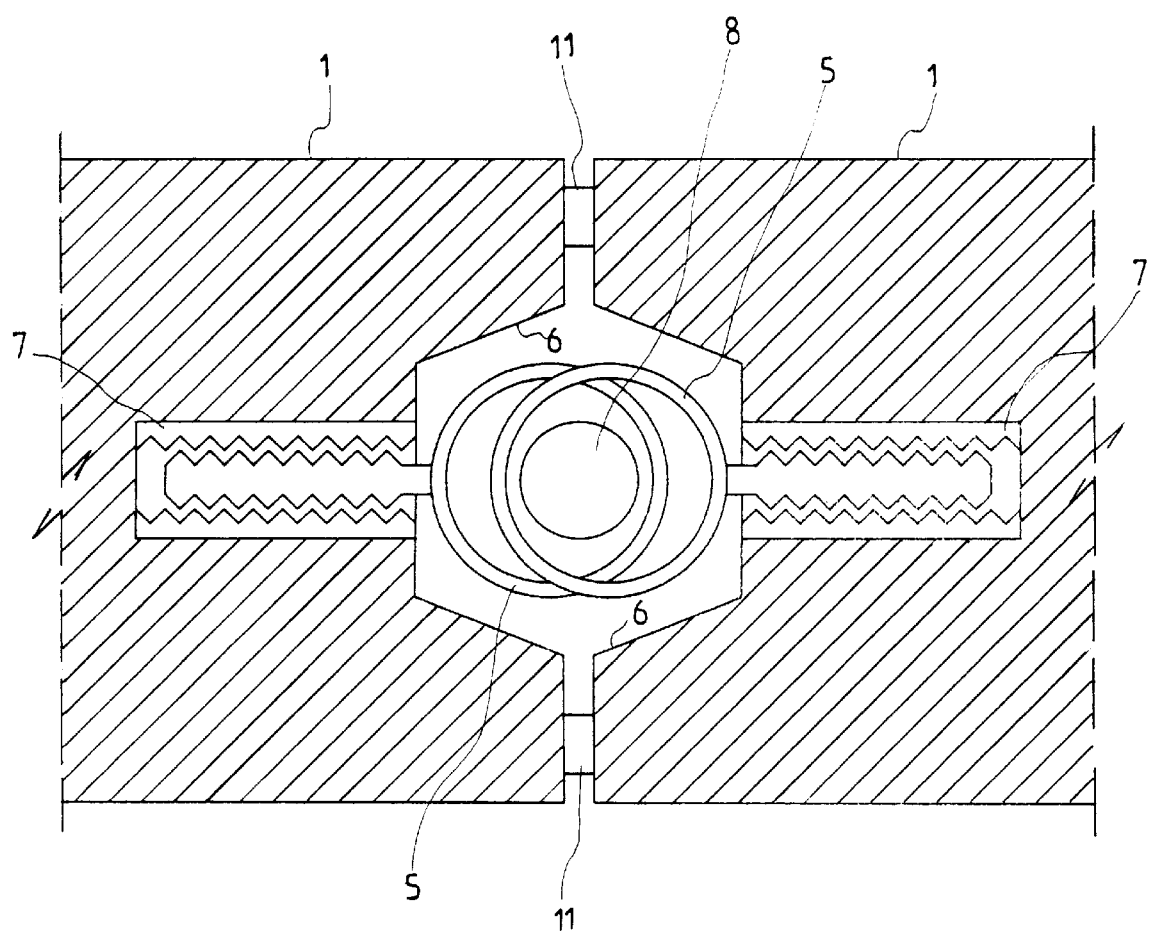
FIG. 3 is a cross-sectional view illustrating the condition in which connecting eye bolts according to the embodiment of FIG. 1 are connected together by a steel rod.

FIG. 3 illustrates the configuration of the coupling according to the embodiment of FIG. 1 in which the coupling consists of connecting eye bolts 5. As shown in FIG. 3, each connecting eye bolt 5 is threadedly coupled to a nut 7 buried in the culvert body 1 at an associated one of the mortar recesses 6. The nut 7 is held in position, upon casing concrete into a culvert body, in such a fashion that it is buried in the concrete. After the concrete is cured, the nut 7 is fixed by the cured concrete.

Figure 4:
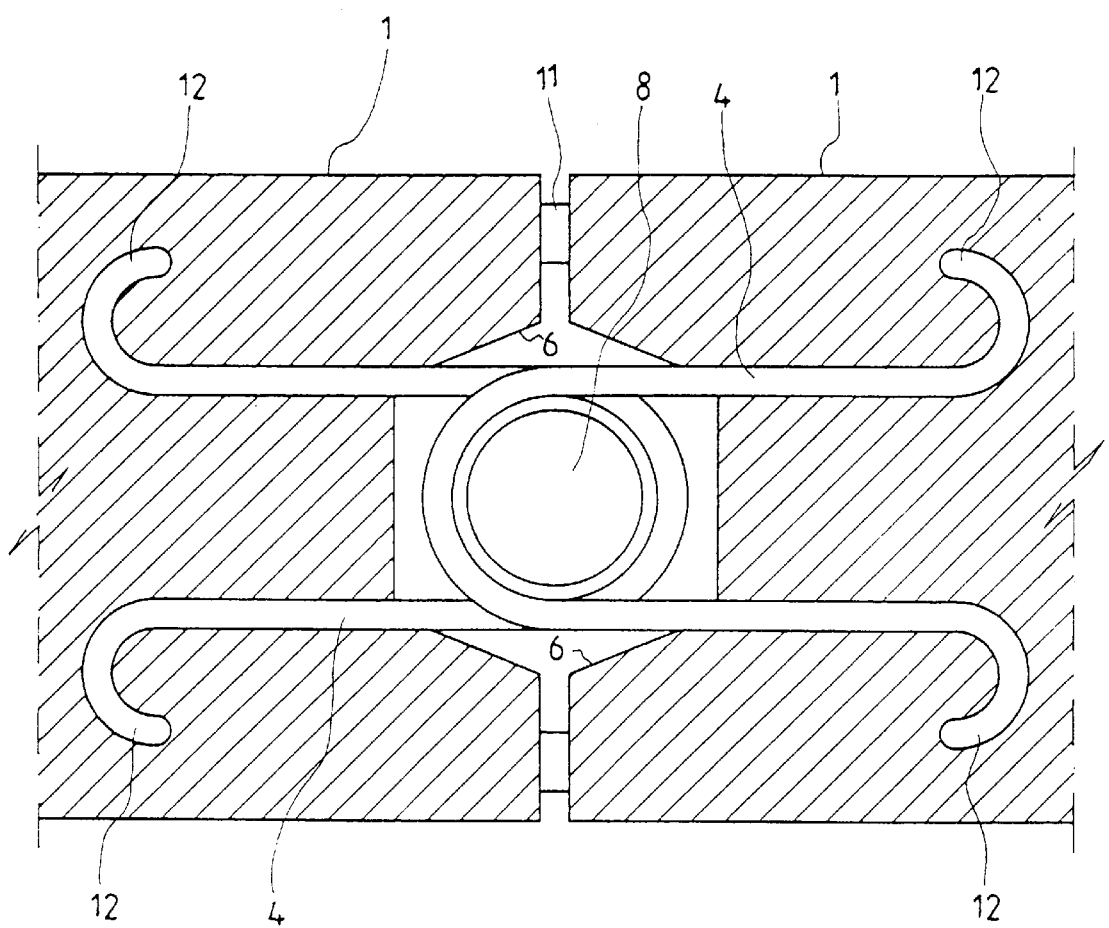
FIG. 4 is a cross-sectional view illustrating the condition in which U-shaped coupling members according to another embodiment of the present invention are connected together by a steel rod.

On the other hand, FIG. 4 illustrates a coupling according to another embodiment of the present invention in which the coupling consists of U-shaped coupling members 4. Each coupling member 4 is arranged at an associated one of the mortar recesses 6 and provided at both ends thereof with anchors 12, respectively. The anchors 12 are buried in the culvert body 1. The coupling member 4 is held in position, upon casing concrete into a culvert body, in such a fashion that its anchors 12 are buried in the concrete with its central portion being exposed in the mortar recess 6. After the concrete is cured, the coupling member 4 is fixed by the cured concrete.

Now, a procedure for assembling culverts together will be described in conjunction with FIG. 5.

Figure 5:
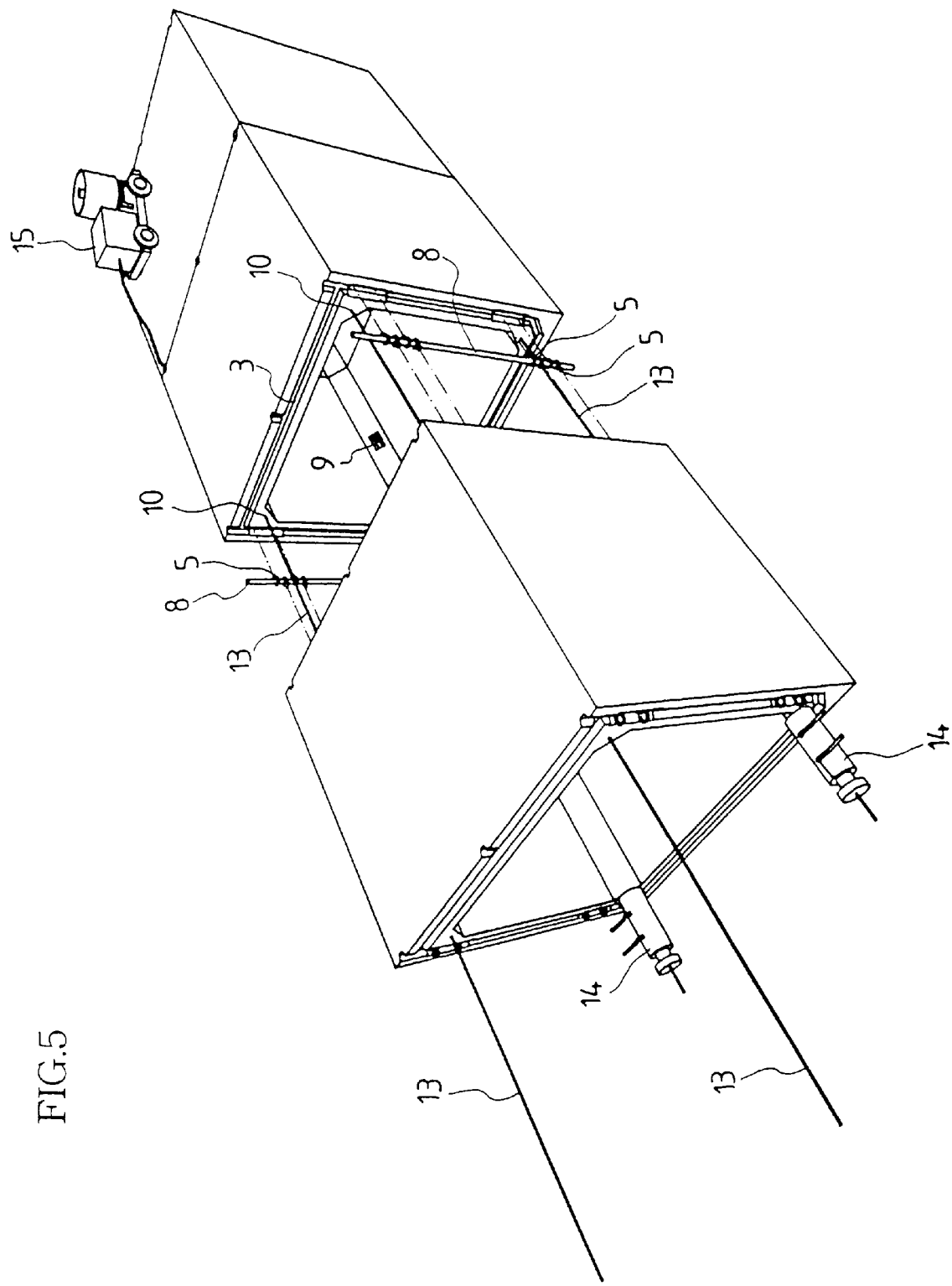
FIG. 5 is a view illustrating the procedure for assembling culverts having the construction according to the present invention.

As shown in FIG. 5, steel wires 13, which emerge from respective steel wire guide passages 10 of one culvert, namely, a first culvert, are first inserted into respective steel wire guide passages 10 of another culvert, namely, a second culvert, to be connected to the first culvert. One end of each steel wire 13 is fixed to the first culvert at an associated one of the openings 9 by means of a well-known fixing member (not shown). The other end of the steel wire 13 is outwardly protruded from the associated steel wire guide passage 10 of the second culvert. The second culvert is then moved toward the first culvert by drawing the other end of the steel wire 13 against the second culvert by means of a steel wire drawing machine 14. When the second culvert comes into contact with the first culvert, the steel wire 13 is fixed to the second culvert at the associated opening 9 by means of a well-known fixing member.

In the above mentioned state in which the first and second culverts are in contact with each other at their facing longitudinal ends, each pair of connecting eye bolts 5 provided at the first culvert are vertically aligned with an associate pair of connecting eye bolts 5 provided at the second culvert, as shown in FIG. 3. In this state, the connecting eye bolts 5 of the first and second culverts can be connected together by vertically inserting a steel rod 8 into a vertical space defined by the facing mortar grooves 3 in such a manner that the steel rod 9 extends through eye portions of the connecting eye bolts 5 vertically aligned together. Thus, the culverts are connected to each other.

In the case of the embodiment illustrated in FIG. 4, neighboring culverts are connected to each other using steel rods in the same manner as mentioned above.

After the culverts are connected to each other using steel rods, mortar is poured into the space defined by the facing mortar grooves 3 of the culverts, using a grouting machine 15, in such a fashion that the couplings of the culverts are completely buried in the mortar layer. Thus, the culverts are firmly connected together by the connected couplings as well as the cured mortar layer.

As apparent from the above description, the present invention provides a prefabricated pre-cast culvert provided with couplings. The associated couplings of neighboring culverts to be connected together are aligned with each other so that a steel rod extends through the aligned couplings. After being coupled together by the steel rod, the couplings are buried in a mortar layer formed between facing longitudinal end surfaces of the culverts. After the mortar layer is cured, the couplings are firmly maintained. In accordance with the present invention, therefore, it is possible to prevent a leakage of water from occurring at the connections of culverts even when a differential subsidence of the ground, on which those culverts are placed, occurs.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A prefabricated pre-cast culvert, comprising:

a first box-shaped tubular culvert body having opposite sides, and being open at both longitudinal ends thereof and having generally flat, opposite end surfaces, and a pair of mortar grooves each formed on one of said opposite end surfaces in such a fashion that they extend along the entire length of said opposite end surfaces as a closed channel upon being paired together with a mortar groove of another like culvert body, with a packing/sealing member disposed about said mortar grooves, and wherein a plurality of couplings are arranged in each of said pair of mortar grooves on at least a pair of opposite sides; and further including at least a pair of mortar filling passages on a top side of said culvert body for enabling mortar to be poured into said mortar grooves.

2. The prefabricated pre-cast culvert according to claim 1, wherein each of the couplings comprises at least one connecting eye bolt threadedly coupled to the culvert body.

3. The prefabricated pre-cast culvert according to claim 1, wherein each of the couplings comprises at least one U-shaped coupling member have an anchor, provided at both ends thereof with said anchors secured to said culvert body, respectively.

4. The prefabricated pre-cast culvert according to claim 1, wherein each of the couplings has an eye aligned with an eye of a corresponding coupling provided at a second said body cilvert which is to be longitudinally connected to said first box-shaped tubular culvert body when said first and second culvert bodies are in contact with each other at their facing end surfaces, so that said culvert bodies can be permanently connected to each other by metal rods inserted into said aligned eyes of said couplings, and with the mortar solidified about said metal rods and about said mortar grooves.

5. The prefabricated pre-cast culvert according to claim 4, wherein every corner of said box-shaped tubular culvert body is provided with a wired connection.

6. The prefabricated pre-cast culvert according to claim 4, wherein each corner of said box-shaped tubular culvert body is provided with a wired connection therebetween, in addition to said metal rods in said aligned eyes of said couplings with the mortar solidified about said metal rods and said aligned eyes of said couplings.

7. The prefabricated pre-cast culvert according to claim 1, further including a tightened wire fixed to said box-shaped tubular culvert body, by passing through wire guide passages in said culvert body and being secured at openings in said culvert body.

8. The prefabricated pre-cast culvert according to claim 4, wherein said openings are disposed inside of said box-shaped tubular culvert body.

* * * * *